(No Model.)
H. FAULKNER.
PNEUMATIC TIRE.
No. 571,947.   Patented Nov. 24, 1896.
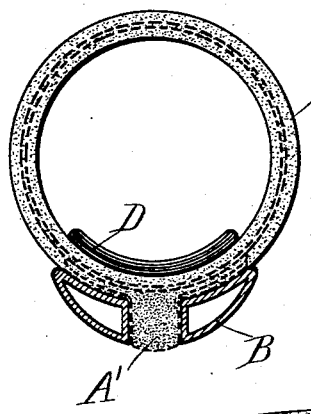
Fig. 1.
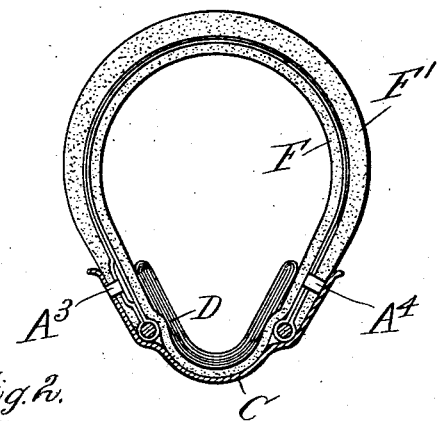
Fig. 3.
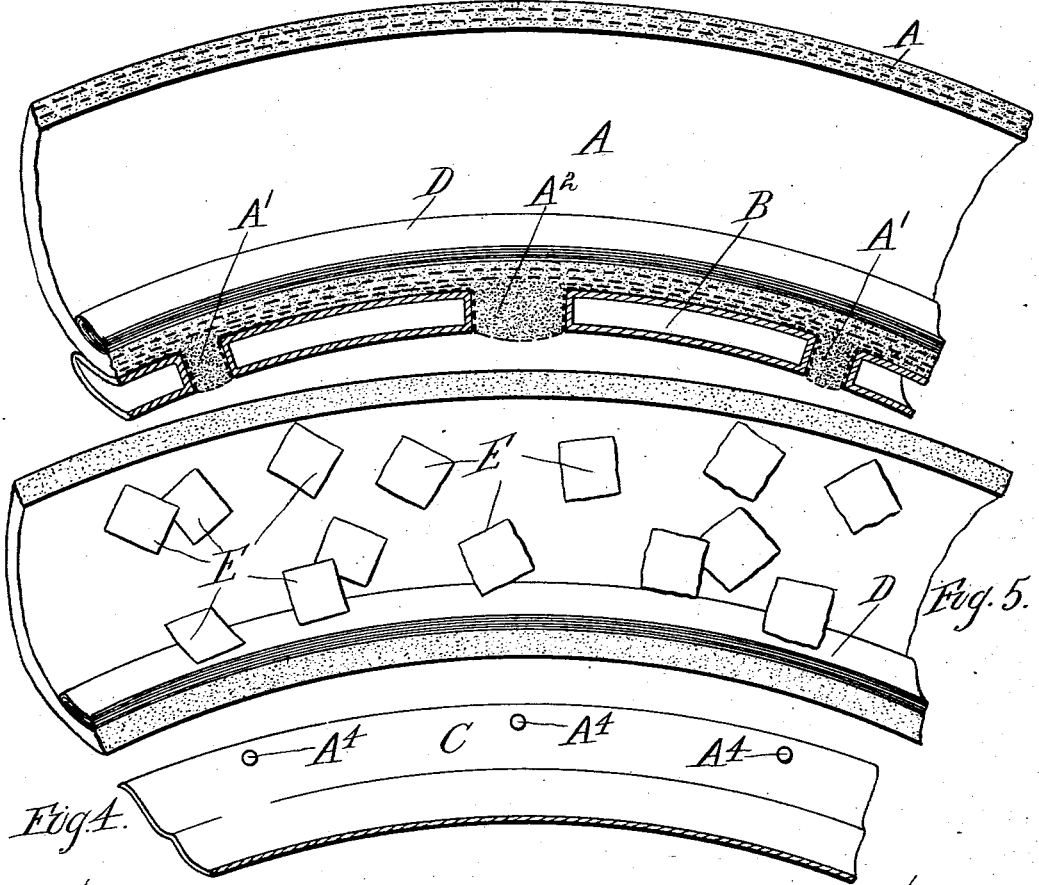
Witnesses:
A. F. Durand.
Margaret M. Wagner
Inventor:
Hugh Faulkner
by Page & Belfield
Attys.
THE NORRIS PETERS CO., PHOTO-LITHO., WASHINGTON, D. C.

UNITED STATES PATENT OFFICE.

HUGH FAULKNER, OF LEICESTER, ENGLAND, ASSIGNOR, BY MESNE ASSIGNMENTS, TO FRED W. MORGAN AND RUFUS WRIGHT, OF CHICAGO, ILLINOIS.

PNEUMATIC TIRE.

SPECIFICATION forming part of Letters Patent No. 571,947, dated November 24, 1896.

Application filed June 8, 1896. Serial No. 594,721. (No model.) Patented in England April 10, 1893, No. 7,288.

*To all whom it may concern:*

Be it known that I, HUGH FAULKNER, rubber manufacturer, a subject of the Queen of Great Britain, residing at Rackleigh, London Road, Leicester, county of Leicester, England, have invented a certain new and useful Improvement in Pneumatic Tires for the Wheels of Velocipedes and other Vehicles, of which the following is a specification, the same being described in Letters Patent of Great Britain heretofore granted to me and dated April 10, 1893, and numbered 7,288.

The object of this invention is to provide improved means for securing the automatic closure of punctures occurring in pneumatic tires; and to such end it consists in small puncture-closing pieces and a liquid, such as glycerin or water, within the air-chamber of a pneumatic tire. The liquid thus employed lubricates the wall of the air-chamber, and the small puncture-closing pieces are free to shift about in the liquid within such chamber. Owing to the presence of the liquid, the puncture-closing pieces will be thrown toward and distributed over the inner peripheral wall portion of the air-chamber by centrifugal force when the tire is in motion and will readily shift toward an adjacent puncture. Without the liquid such distribution will not occur. The liquid can be poured into the air-chamber, it being evident that after the liquid has been introduced the revolution of the tire will cause the liquid to thus coat the wall of the air-chamber and take the puncture-closing pieces, and that, owing to its presence, the small puncture-closing pieces will be distributed during the revolution of the tire, as shown in Figure 5.

Fig. 1 is a transverse section of a single-tube pneumatic tire, and Fig. 2 is a longitudinal section of a portion thereof. Fig. 3 is a transverse section of a pneumatic tire consisting of an air-tube and an outer protective jacket. Fig. 4 is a plan of the under side of a portion of one side of the wheel-rim used with the tire shown in Fig. 3. Fig. 5 is a longitudinal section of a portion of a single-tube pneumatic tire.

Referring to Figs. 1 and 2, the tire A and rim B are constructed in such a manner as to prevent "creeping," as already hereinbefore stated. For this purpose the tire is formed with one or more projections of any suitable shape. A convenient form of projection may be in the form of a stud $A'$ or more or less elongated, such as $A^2$. In any case similarly-shaped openings or recesses are formed in the rim to receive the said projections.

In a tire consisting of a separate air-tube F and an outer protective jacket $F'$, as shown in Fig. 3, the projections $A^3$ may either be formed at intervals around the edge of the outer protective jacket $F'$ and fit into correspondingly-shaped openings in the wheel-rim C, or projections $A^4$ may be formed on or connected to the wheel-rim, Figs. 3 and 4, and lodge into holes, preferably eyeleted, along the edge of the said jacket.

To protect the air-chamber against double puncturing, that part of the air-chamber located nearest to the wheel-rim has connected thereto a protective pad D, which may be of rubber and canvas, or leather, or other suitable material, cemented or otherwise attached within the air-chamber, as shown in Fig. 1.

Fig. 5 illustrates a further part of the invention and includes the means I adopt to prevent the escape of air when the wall of the air-chamber has become punctured.

As before mentioned, I place within the air-chamber A, prior to inflating it, a number of loose and detached pieces E of air-proof fabric or like material which, when a puncture takes place, will be carried by the stream of outgoing air and become lodged against the side of the air-chamber by the internal air-pressure, thereby stopping the further escape of air and the consequent deflation of the tire. I also introduce a liquid within the air-chamber, and when such liquid is introduced the light loose patching or puncture-closing particles will, of course, be free to move about in the same and, obviously, during the movement of the wheel such particles will be naturally thrown toward the tread side of the tire by centrifugal action.

What I claim as my invention is—

1. A pneumatic tire containing within the air-chamber, small pieces of puncture-closing material and a liquid, the puncture-closing pieces being free to move in the liquid and to distribute themselves automatically, substantially as set forth.

2. A pneumatic tire having the inner wall of its air-chamber lubricated, and inclosing loose puncture-closing pieces within such air-chamber, said puncture-closing pieces being free to shift about, substantially as set forth.

HUGH FAULKNER.

Witnesses:
F. HOOD,
WALTER W. BALL.